(12) United States Patent
Van Den Engel

(10) Patent No.: US 8,555,994 B2
(45) Date of Patent: Oct. 15, 2013

(54) AGRICULTURAL DEVICE

(75) Inventor: Alfonsus Jacobus Van Den Engel, Schiedam (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/165,806

(22) Filed: Jun. 22, 2011

(65) Prior Publication Data

US 2011/0247844 A1 Oct. 13, 2011

Related U.S. Application Data

(63) Continuation of application No. PCT/NL2009/000266, filed on Dec. 21, 2009.

(30) Foreign Application Priority Data

Dec. 22, 2008 (NL) ...................................... 1036352

(51) Int. Cl.
*A01B 59/043* (2006.01)

(52) U.S. Cl.
USPC .............. 172/47; 172/272; 172/439; 180/14.4

(58) Field of Classification Search
USPC ........... 172/47, 272, 274, 315, 322, 323, 439, 172/452, 492, 311, 325, 324, 463, 443, 214, 172/232, 204, 210, 799.5; 180/14.4, 53.1, 180/53.3, 53.8, 900
See application file for complete search history.

(56) References Cited

U.S. PATENT DOCUMENTS

| 2,482,976 | A | * | 9/1949 | Harwood | 366/45 |
| 3,489,431 | A | * | 1/1970 | Beckwith et al. | 172/272 |
| 4,525,987 | A | * | 7/1985 | Werner et al. | 56/15.2 |
| 4,612,997 | A | * | 9/1986 | Wilkins | 172/776 |
| 4,805,927 | A | * | 2/1989 | Stephenson et al. | 172/47 |
| 4,838,015 | A | * | 6/1989 | Mouret et al. | 56/15.7 |
| 4,838,358 | A | * | 6/1989 | Freudendahl | 172/125 |

(Continued)

FOREIGN PATENT DOCUMENTS

| DE | 196 35 958 A1 | 4/1997 |
| DE | 103 32 751 A1 | 2/2005 |

(Continued)

OTHER PUBLICATIONS

ISR and Written Opinion from PCT/NL2009/000266 issued Mar. 23, 2010 by the EPO.

*Primary Examiner* — Jamie L McGowan
(74) *Attorney, Agent, or Firm* — Hoyng Monegier LLP; Coraline J. Haitjema; David P. Owen

(57) ABSTRACT

An agricultural device is couplable to a tractor vehicle with carrier arms. The agricultural device comprises a carrier frame with a set of wheels and a coupling device for coupling the agricultural implement to a tractor vehicle. The agricultural device further comprises a coupling frame having at least one coupling point for coupling of the coupling frame to both carrier arms of the tractor vehicle. The coupling frame is connected to the carrier frame so as to be rigid in rotation in the vertical plane, wherein at least one coupling point of the coupling frame is positioned on or above the center line of the carrier frame. Owing to the fact that the carrier arms extend horizontally or upwards, the carrier arms will not or will hardly get out of position as a result of the travelling of the vehicle.

19 Claims, 3 Drawing Sheets

(56) References Cited

U.S. PATENT DOCUMENTS

| | | | |
|---|---|---|---|
| 5,099,937 A * | 3/1992 | McLean | 180/53.3 |
| 5,111,603 A * | 5/1992 | Knowlton et al. | 37/231 |
| 5,152,357 A * | 10/1992 | McLean et al. | 180/53.3 |
| 5,186,271 A * | 2/1993 | McLean | 180/14.4 |
| 5,303,790 A * | 4/1994 | Coleman | 180/53.3 |
| 5,335,856 A * | 8/1994 | Nathan | 239/164 |
| 5,339,907 A * | 8/1994 | Roth | 172/678 |
| 5,522,208 A * | 6/1996 | Wattron | 56/15.1 |
| 5,528,886 A * | 6/1996 | Esau | 56/14.9 |
| 5,706,901 A * | 1/1998 | Walters et al. | 172/439 |
| RE35,835 E * | 7/1998 | Eidam et al. | 180/14.4 |
| 5,816,339 A * | 10/1998 | Parsons et al. | 172/449 |
| 5,829,536 A * | 11/1998 | Pigg et al. | 172/482 |
| 5,873,229 A * | 2/1999 | Franet | 56/15.7 |
| 6,149,180 A * | 11/2000 | Haws | 280/479.1 |
| 6,412,570 B1 * | 7/2002 | Pruitt et al. | 172/449 |
| 7,264,064 B2 * | 9/2007 | Ehrhart et al. | 172/449 |
| 7,334,645 B2 * | 2/2008 | Stevenson et al. | 172/677 |
| 7,347,039 B2 * | 3/2008 | Koehn | 56/15.9 |
| 7,975,776 B2 * | 7/2011 | Chimento et al. | 172/272 |

FOREIGN PATENT DOCUMENTS

| | | |
|---|---|---|
| EP | 1 021 943 A2 | 7/2000 |
| FR | 2 904 182 A1 | 2/2008 |
| JP | 05123003 A * | 5/1993 |

* cited by examiner

AGRICULTURAL DEVICE

CROSS REFERENCE TO RELATED APPLICATIONS

This application is a continuation of PCT application number PCT/NL2009/000266 filed on 21 Dec. 2009, which claims priority from Netherlands application number NL 1036352 filed on 22 Dec. 2008. Both applications are hereby incorporated by reference in their entireties.

BACKGROUND OF THE INVENTION

1. Field of the Invention

The present invention relates to an agricultural device. The agricultural device is configured to couple an agricultural implement to a tractor vehicle. The tractor vehicle has carrier arms. The agricultural device is couplable only to the carrier arms of the tractor vehicle, in order to transmit tensile forces. The agricultural device serves as an auxiliary device for the coupling of at least one agricultural implement. The agricultural implement is for example a tedder or a mower. The agricultural device comprises a carrier frame extending in the longitudinal direction, for example a drawbar, with a set of wheels and a coupling device at the first end. The agricultural implement can be coupled to the agricultural device via the coupling device, so that the agricultural implement is located behind the agricultural device. The agricultural implement can also be held in a working and raised position with the aid of the coupling device. The raised position can for example be used as a headland position or transport position. The assembly made up of the agricultural device with the agricultural implement can be coupled to the tractor vehicle.

At a second end, the agricultural device has a coupling frame for coupling of the agricultural device to the tractor vehicle. The coupling frame can be connected to the carrier frame so as to be hingeable about an upward axis of rotation. The coupling frame has at least one coupling point for coupling to the carrier arms of the tractor vehicle. The agricultural device can further comprise a drive coupling shaft with a centre line so as to allow the agricultural implement to be coupled to the drive shaft of the tractor vehicle. The drive coupling shaft extends from the coupling frame up to the coupling device.

2. Description of the Related Art

The tractor vehicle is equipped with carrier arms for the coupling. DIN 9674, which is hereby incorporated by reference in its entirety, describes in a standard for agricultural tractors and machines a three-point coupling with two carrier arms and a top link. The two carrier arms and the top link each have a free end for the coupling of the agricultural device. The two carrier arms are hingeably fastened below a drive shaft. The free ends of the carrier arms are movable from a position below the drive shaft to a position above the drive shaft. The carrier arms of the three-point coupling can be driven in order to move a load upwards or downwards. The invention relates to a coupling of the agricultural device to the tractor vehicle wherein no use is made of the top link.

Usually, the carrier arms can be energized only upwards using a hydraulic cylinder in order to carry the load, for example an agricultural implement. The hydraulic cylinder has a piston which is movable back and forth. A hydraulic fluid is located below the piston. Air is located above the piston. The piston can be moved upwards by increasing fluid pressure below the piston. Owing to the load on the carrier arms, the piston will fall again as the fluid pressure drops.

The known carrier arms have the problem that, after the carrier arms have been brought into an intermediate or low position, the piston can continue to move upwards. That is to say, in the event of an upward force on the carrier arms, the piston in the cylinder can move upwards, wherein merely air resistance has to be overcome. Upward forces can occur as a result of the towing of the agricultural device. As a result, the carrier arms can move from a lower position upwards to an intermediate position, wherein the carrier arms enter a substantially horizontal position. The prior art usually provides a top link in order to hold the carrier arms in a low position during the towing of the agricultural device. If the top link is not present in the coupling of the agricultural device to the tractor vehicle, there is therefore the risk that the carrier arms will rise in an unexpected and undesirable manner. This upward movement of the carrier arms can occur at unexpected moments. This can give rise to dangerous situations during tillage on the ground when heavy components unexpectedly start to move. Furthermore, damage can occur to the tractor vehicle or to the coupled agricultural implement.

The undesirable upward movement of the carrier arms is particularly important when an agricultural implement is coupled to the tractor vehicle behind the set of wheels of the agricultural device described hereinbefore. When the agricultural implement is brought into the raised position, the agricultural device can tilt over the set of wheels and an upward force is produced acting on the carrier arms. This can cause the carrier arms to move upwards, wherein the carrier arms can come to a halt with a bang in an extremely high position. Apart from the fact that this can lead to dangerous situations and damage, a further drawback is the fact that the upward movement of the carrier arms and the accompanying upward hinging of the carrier frame also ensures a downwardly directed movement of the agricultural implement. This can result in an excessively low arrangement of the agricultural implement in a transport position, as a result of which the agricultural implement can become damaged during transportation owing to collisions with the ground.

BRIEF SUMMARY OF THE INVENTION

The object of the present invention is to at least partially overcome at least one of the above-mentioned drawbacks, or else to provide a usable alternative.

This object is achieved by an agricultural device for coupling an agricultural implement to a tractor vehicle, wherein the tractor vehicle has carrier arms, wherein the agricultural device is couplable only to the carrier arms of the tractor vehicle, in order to transmit tensile forces, comprising: a carrier frame which extends in the longitudinal direction over a centre line and has at a first end a set of wheels and a coupling device for coupling the agricultural implement, wherein the agricultural implement can be held by means of the coupling device in a working position and in a raised position, a coupling frame which is connected to a second end of the carrier frame so as to be hingeable about an upward axis of rotation, wherein the coupling frame has at least one coupling point for coupling of the coupling frame to both carrier arms of the tractor vehicle, wherein the coupling frame is connected to the carrier frame so as to be rigid in rotation in the vertical plane, wherein at least one coupling point of the coupling frame is positioned on or above the centre line of the carrier frame.

The agricultural device according to the invention is couplable to a tractor vehicle with carrier arms. The agricultural device is couplable for transmitting tensile forces only to the carrier arms of the tractor vehicle. The agricultural device is configured to couple an agricultural implement to the tractor vehicle.

The agricultural device comprises a carrier frame which extends in the longitudinal direction over a centre line and has at a first end a set of wheels and a coupling device for coupling the agricultural implement, wherein the agricultural implement can be held by means of the coupling device in a working position and in a raised position. In particular, the coupling device is configured to couple an agricultural implement behind the carrier frame.

The agricultural device further comprises a coupling frame which is connected to a second end of the carrier frame. The coupling frame has at least one coupling point for coupling of the coupling frame to both carrier arms of the tractor vehicle. In an embodiment, the coupling frame can be connected to the carrier frame so as to be hingeable about an upward axis of rotation. The distance between the agricultural implement and the tractor vehicle can be increased with the aid of the agricultural device, so that it is possible to use agricultural implements having a larger range. In this case, it may be advantageous to couple the coupling frame to the carrier frame so as to be hingeable about a vertical axis of rotation, because this allows the turning circle of the assembly according to the invention to remain limited. Preferably, the coupling frame extends longitudinally over at least 50 cm. Preferably, the carrier frame extends longitudinally over at least 150 cm, in particular over at least 200 cm. This advantageously allows the assembly to be suitable for an agricultural implement having a large range.

A characteristic feature of the invention is the fact that the coupling frame is connected to the carrier frame so as to be rigid in rotation in the vertical plane, wherein at least one coupling point of the coupling frame is positioned on or above the centre line of the carrier frame. Here, 'rigid in rotation' means that the connected parts are not mutually rotatable. In an assembly of the tractor vehicle with the agricultural device, the coupling point is vertically positioned in such a way that, after coupling of the agricultural device to the tractor vehicle, the carrier arms extend horizontally or upwards from the tractor vehicle. Owing to the fact that the carrier arms extend horizontally or upwards, the carrier arms will not or will hardly get out of position as a result of the travelling of the vehicle. A downward movement of the carrier arms can be prevented by a hydraulic cylinder. When the carrier arms are positioned in a higher position, it is possible to keep down the risk of an unexpected upward movement of the carrier arms as a result of the raising of the agricultural implement causing damage. If the stroke of the carrier arms from an intermediate position to the highest position is to a limited extent smaller, the bang with which the carrier arms come to a halt in the highest position can remain limited.

In a preferred embodiment of the assembly of the tractor vehicle with the agricultural device according to the invention, the carrier arms of the tractor vehicle are placed in a highest position after coupling of the agricultural device, so that the carrier arms cannot move or can hardly move during the raising of the agricultural implement behind the set of wheels of the agricultural device. A further advantage of the assembly according to the invention can furthermore be the fact that the carrier frame can have a lower weight. That is to say, the carrier frame does not have to form a counterweight to the agricultural implement behind the agricultural device.

In an embodiment of the assembly of the tractor vehicle with the agricultural device according to the invention, the coupling point is located after coupling at least 80 cm, in particular 100 cm, but preferably 120 cm above the ground.

Preferably, the carrier frame extends after coupling substantially horizontally in a direction from the vehicle. Preferably, the tractor vehicle has a drive shaft which is positioned, after coupling of the agricultural device, substantially at the same height as an end of the drive coupling shaft close to the connection of the coupling frame to the carrier frame.

The agricultural device according to the invention is intended for coupling an agricultural implement to a tractor vehicle. The tractor vehicle is provided with carrier arms. The agricultural implement can be coupled to the tractor vehicle via the agricultural device. The agricultural device comprises a carrier frame which extends in the longitudinal direction and has at a first end a set of wheels and a coupling device for coupling the agricultural implement. The agricultural implement can be held in a working position and in a transport or headland position with the aid of the coupling device. If the agricultural implement requires driving from a drive shaft of the tractor vehicle, the agricultural device can comprise a drive coupling shaft with a centre line for coupling the agricultural implement to the drive shaft of the tractor vehicle.

The agricultural device further comprises a coupling frame which can be hingeable about an upward axis of rotation and is connected to a second end of the carrier frame. As a result of the presence of the upward axis of rotation between the carrier frame and the coupling frame, the turning circle of a combination of a tractor vehicle with the agricultural device can remain small. The coupling frame has at least one coupling point for coupling of the coupling frame to the carrier arms of the tractor vehicle. The coupling frame is not freely hingeable about a horizontal axis of rotation. The coupling frame is connected to the carrier frame so as to be rigid in rotation in a vertical plane. In the vertical plane, the coupling frame cannot rotate with respect to the carrier frame.

In an embodiment of the agricultural device, the carrier frame comprises a drawbar. Preferably, the drawbar extends, after coupling to a tractor vehicle, substantially in the horizontal direction. Preferably, a drive coupling shaft extends parallel to the carrier frame and preferably substantially horizontally after coupling to the drive shaft of a tractor vehicle. The invention concerns particularly the use of agricultural implements having a large range of for example at least 5 meters. For this purpose, the carrier frame extends preferably from the coupling frame over a length of at least 2 meters, in particular at least 3 meters and preferably at least 4 meters to the set of wheels. As a result of the use of such a large carrier frame, it is possible to obtain a distance between the agricultural implement and the tractor vehicle such that a crop can be treated over a large range.

A characteristic feature of an embodiment is the fact that at least one coupling point of the coupling frame is positioned on or above the centre line of the drive coupling shaft or the carrier frame. When the agricultural implement behind the agricultural device is to be driven from the tractor vehicle, the centre line of the drive coupling shaft preferably is aligned with respect to the drive shaft of the tractor vehicle. The drive coupling shaft can be coupled to the drive shaft of the tractor vehicle. The centre line of the drive coupling shaft, in particular at the site of the coupling to the drive shaft, serves as a reference for the height of at least one of the coupling points of the coupling frame. If there is no drive coupling shaft, the centre line of the carrier frame can form a good reference.

The at least one coupling point of the coupling frame can be coupled to the carrier arms of a tractor vehicle, wherein the carrier arms can move over a stroke from an extremely low position to an extremely high position. During coupling of the coupling frame to a carrier arm of a tractor vehicle, the carrier arm can automatically enter an intermediate position through the corresponding high coupling point, wherein the end of the carrier arm is higher than the drive shaft. As a result of the fact that the end of the carrier arm is already positioned so high, the remaining stroke of the carrier arm to the extremely high position can remain limited or even be absent. Preferably, the remaining stroke of the carrier arm is zero and the carrier arm is thus already in the extremely high position. This is advantageous because the risk of damage or accidents as a result of the carrier arm passing unexpectedly through the remaining stroke to the extremely high position can remain considerably limited. As a result of the use of the agricultural device with an agricultural implement coupled thereto, the occurrence of upwardly directed forces acting on the carrier arms is increased. Advantageously, the forces can be sufficiently absorbed by the at least one coupling point positioned above the centre line of the drive coupling shaft, so that damage can be prevented. Preferably, the coupling points of the coupling frame for the coupling to a carrier arm of the tractor vehicle are positioned at substantially the same height.

In a particular embodiment of the agricultural device according to the invention, the coupling point of the coupling frame is height-adjustable. This allows the agricultural device according to the invention to be optimally used in tractor vehicles having a different extremely high position of the carrier arm. Advantageously, the agricultural device can in each case be arranged in such a way that the carrier arms of the tractor vehicle enter the extremely high position, allowing unexpected movements of the carrier arms to be prevented. This allows the carrier frame to extend, on use of the agricultural device in differently embodied tractor vehicles, in each case substantially horizontally, so that the agricultural implement arranged behind the agricultural device can in each case remain aligned at the same height. Advantageously, the tensioning for orienting the agricultural implement can remain low as a result of the height setting which is present. Vertical readjustment of the agricultural implement can therefore be dispensed with.

As described hereinbefore, the coupling frame is connected to the carrier frame so as to be rotationally rigid in the vertical plane. During operation, this prevents the coupling frame from hinging freely with respect to the carrier frame. In an embodiment of the agricultural device according to the invention, the rotation of the coupling frame with respect to the carrier frame in the vertical plane can be prevented by a locking means, as a result of which the operating of the locking means maintains the possibility of vertically adjusting the at least one coupling point with respect to the carrier frame.

In an embodiment of the agricultural device according to the invention, the coupling frame is V-shaped. In an equivalent embodiment, the coupling frame is U-shaped. The V or U-shaped coupling frame has an open space between two arms with a coupling point at the end. Typically, a V or U-shaped coupling frame does not have a crossbar, thus providing the open space. The advantage of a V-shaped or U-shaped coupling frame is that the coupling frame can pass the drive shaft through the open space during the upward and downward movement of the carrier arms. This limits the risk of the drive coupling shaft becoming damaged as a result of the upward and downward movement of the coupling frame. Preferably, the coupling frame has a length of at least 50 cm, in particular at least 80 cm, but preferably at least 120 cm. This makes the agricultural device suitable for the use of agricultural implements having a large range of for example at least 5 meters. Preferably, the V-shaped or U-shaped coupling frame is connected to the carrier frame by means of an upward axis of rotation, wherein the axis of rotation is positioned on the end of the coupling frame opposing the coupling points.

In an embodiment of the agricultural device according to the invention, a safety member is provided for counteracting an excessively high position of the carrier arms. The safety member can form a connection between a fixed coupling point on the tractor vehicle and at least one of the carrier arms. Advantageously, the presence of the safety member allows a part of the load on the carrier arms to be taken over by the safety member, so that overloading of the carrier arms can be prevented. The coupling points of the coupling frame can be vertically positioned in such a way that the carrier arms of the tractor vehicle do not reach the extremely high position. In order to prevent the carrier arms from moving after all to a higher position, a safety member, for example a chain or a cable, can be provided.

In an embodiment of the agricultural device according to the invention, the coupling device for coupling an agricultural implement behind the agricultural device has a fold-up device for placing the agricultural implement in and out of a working position. Preferably, the fold-up device is activatable by a fold-up cylinder. The agricultural implement can be attached by the coupling device to the carrier frame, viewed in the direction of travel, behind the set of wheels and be held by the fold-up device in a raised or in a working position. A raised position may for example be a headland position, wherein the agricultural implement is moved from the working position only upwards. A raised position may furthermore also be a transport position, wherein the combined centre of gravity of tillage members of the agricultural implement in the transport position lies, viewed in the direction of travel, in front of the combined centre of gravity of the tillage members in the working position. As a result of the positioning of at least one of the coupling points above the centre line of the drive coupling shaft, the risk of rising of the carrier arms can advantageously be reduced in such a way that the use of the fold-up device does not have to be problematic.

In an embodiment of the agricultural device according to the invention, a coupled agricultural implement can comprise at both sides of the carrier frame elongate wings with tillage members. The wings can extend in the working position laterally of the carrier frame and be positioned in the transport position parallel to the direction of travel. Advantageously, this allows the upward forces which act on the coupling frame to remain limited during transportation; this can further limit the risk of rising of the carrier arms on the tractor vehicle.

In an embodiment of the agricultural device according to the invention, the tillage members are fastened to a central tillage frame. Preferably, the central tillage frame is fastened to the carrier frame so as to be hingeable about a substantially horizontally directed axis of rotation and the fold-up cylinder is connected to the central tillage frame. This allows simple setting of the depth-gauge clearance and/or the rotor angle of the tillage members, which can advantageously remain better maintained as a result of the use of the agricultural device according to the invention. The tillage members can for example be tedder rotors for picking up and throwing up crops lying on the ground.

The invention also relates to a tedder or mower provided with an agricultural device. The tedder can be used for picking up and throwing up a crop lying on the ground. The mower can be used for mowing a crop, such as grass.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
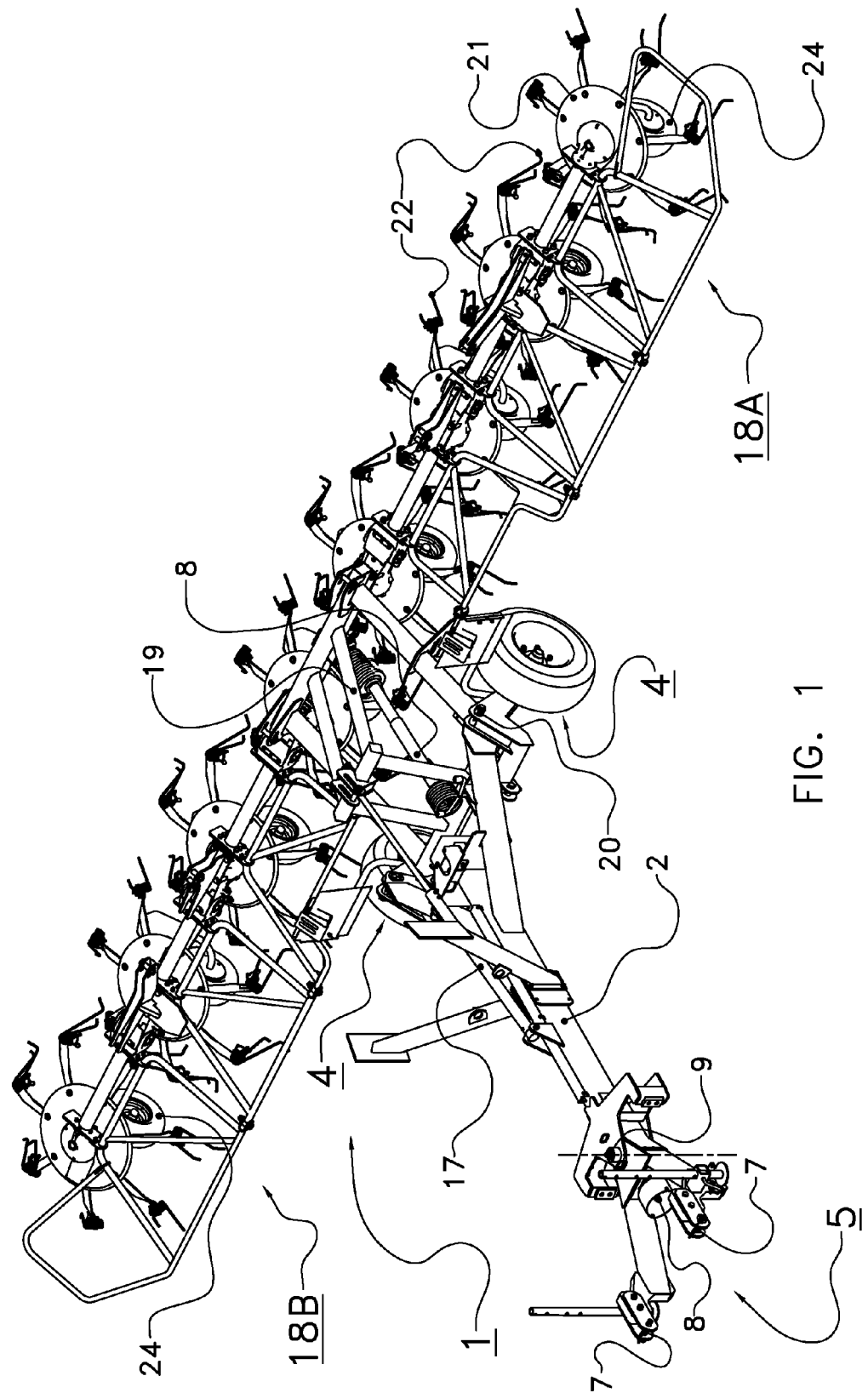
FIG. 1 is a perspective view of an agricultural device according to the invention.

The following is a description of certain embodiments of the invention, given by way of example only and with reference to the drawings. FIG. 1 is a perspective view of an agricultural device 1 comprising a carrier frame 2 for carrying at least one agricultural implement with tillage members. The carrier frame 2 is embodied as a drawbar. The carrier frame 2 is supportable, at least during transportation, on the ground by means of a set of wheels with at least one wheel 4.

The agricultural device 1 further has a coupling frame 5 for coupling the agricultural device 1 to a three-point coupling of a tractor vehicle, for example an agricultural tractor. The coupling frame 5 is shown in greater detail in FIGS. 1A to 1C.

FIG. 1 shows a tedder device with a tedder as an agricultural implement behind the agricultural device 1. The tedder has tillage members 21 for picking up and throwing up crops lying on the ground. The tillage members 21 have the form of tedder rotors. Each of the tillage members 21 is rotatable about an upwardly directed axis and comprises a number of teeth 22 for tilling a crop during the rotating.

Figure 1A:
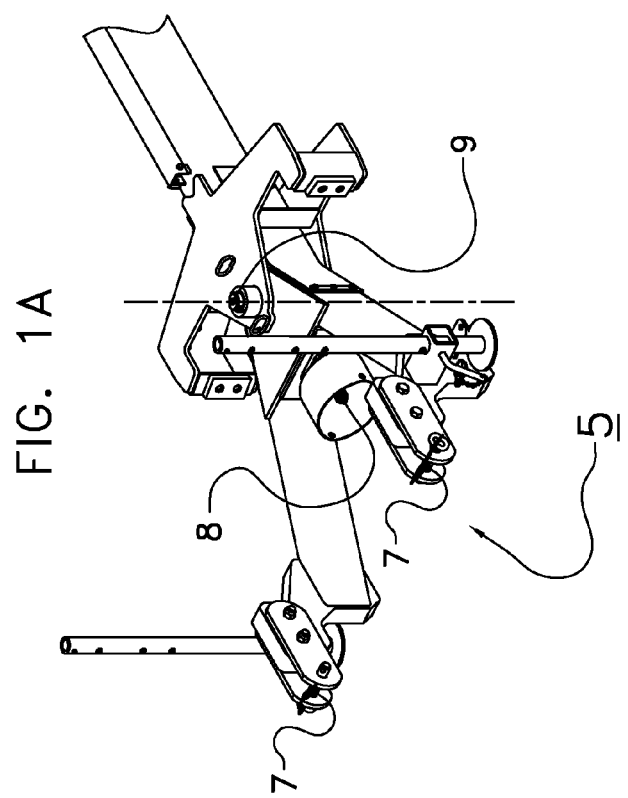
FIG. 1A is a more detailed perspective view of a coupling frame according to the invention.

FIG. 1A is a more detailed perspective view of the coupling frame 5. The coupling frame is embodied in a V-shaped manner with two arms. The arms extend in the same substantially horizontal plane as the carrier frame 2. The arms extend laterally with respect to the carrier frame 2 which is embodied as a drawbar. An upward axis of rotation 9 is provided for a hingeable connection of the coupling frame 5 with respect to the carrier frame 2. At the level of the axis of rotation 9, stops, which can limit the turning circle of the agricultural device with respect to a tractor vehicle, are provided on both sides of the coupling frame. The stops are securely connected to the carrier frame 2. The arms of the coupling frame 5 are provided on one end with coupling points 7. The coupling points are positioned above the carrier frame 2. The arms have on the end supporting blocks which extend in the upward direction. Flanges are mounted on the supporting blocks on both sides by means of two screw connections. Each flange further has a hole containing therein a locking means in the form of a locking pin. An end of a carrier arm can be held between the flanges and be manually fastened there with the aid of the locking pin. As a result, the end of the carrier arm, which forms a point of application, lies above the carrier frame 2. A drive coupling shaft 8 is provided between the arms of the V-shaped coupling frame. As shown in the side view of FIG. 1C, the drive coupling shaft 8 is positioned so as to be lower than the coupling point 7. The drive coupling shaft 8 is provided at substantially the same height as the drawbar 2. The drawbar can be at least partially hollow, for example tubular, wherein the drive coupling shaft can extend into the cavity of the drawbar. In the case of a rotating drive coupling shaft, this can increase the safety of the agricultural device. Close to the coupling points 7, the coupling frame 5 is further provided with at least one prop for supporting the agricultural device toward the ground.

Figure 2:
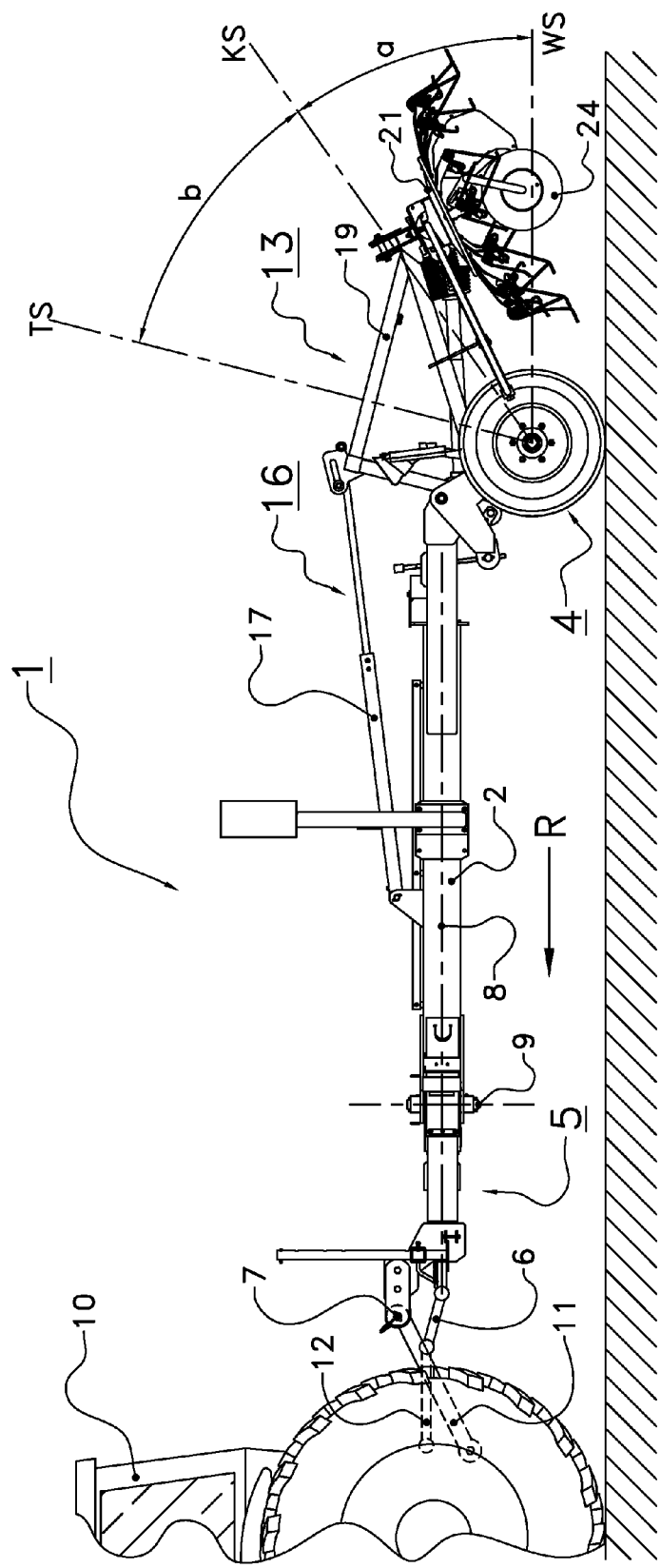
FIG. 2 is a schematic side view of an agricultural device according to the invention.

FIG. 2 shows a coupling of the coupling frame 5 to a tractor vehicle 10. A three-point coupling standardized under DIN 9674 has a top link with therebelow two lowered hingeable carrier arms 11. The carrier arms 11 have a hinge point which lies below a drive shaft 12. The coupling frame 5 is rotatable about an upwardly directed axis of rotation 9 connected to the carrier frame 2. This allows the vehicle to turn round in a small turning circle. The coupling frame 5 has two coupling points 7 for coupling of the coupling frame 5 to the lowered carrier arms 11 of the three-point coupling. The coupling frame 5 does not have a third coupling point 7 for coupling to the top link of the three-point coupling.

Figure 1B:
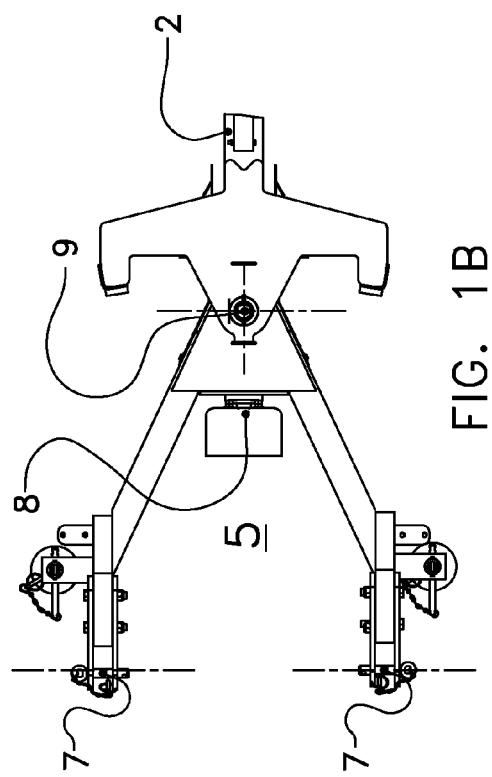
FIG. 1B is a side view of the coupling frame from FIG. 1A.
Figure 1C:
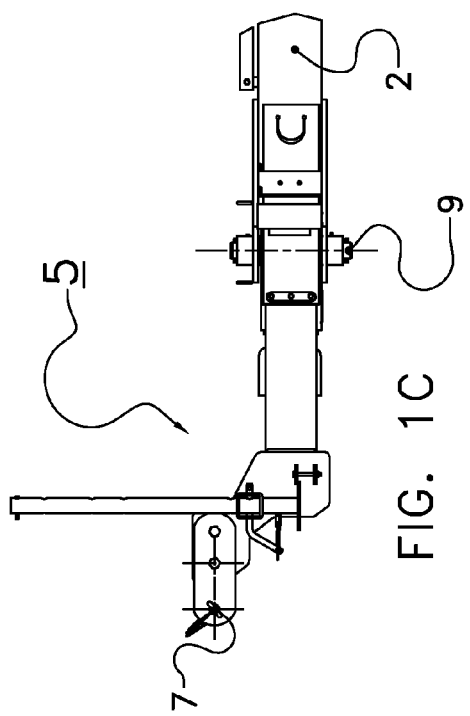
FIG. 1C is a plan view of the coupling frame from FIG. 1A.

As shown in a plan view in FIG. 1B, the coupling frame 5 is embodied so as to be V-shaped with two arms. The coupling frame 5 does not have a crossbar, but does have an open space between the arms, thus allowing the coupling frame 5 to pass through an attached drive coupling 6 during the upward and downward movement of the carrier arms 11 on the tractor vehicle 10.

A drive is provided for driving the tillage members 21. The drive comprises a drive coupling shaft 8 which runs for the most part substantially parallel to the drawbar 2, and which is provided at one end with a drive coupling 6 at the level of the coupling frame 5. The drive coupling 6 is configured to be connected to a drive shaft 12, for example of a tractor. The drive shaft 12 is at substantially the same height as the drive coupling shaft 8 of the agricultural device. The term "substantially at the same height" means that the difference in height can be at most ten centimeters. FIG. 2 shows the drive coupling 6, wherein the centre line of the drive coupling 6 is slightly inclined in the direction toward the tractor vehicle 10 and is connected to the drive shaft 12 of the tractor vehicle 10. The drive coupling 6 forms a cardan connection between the drive shaft 12 and the part of the drive coupling shaft 8 that extends substantially parallel along the carrier frame 2. The coupling point 7 lies higher above the centre line than the drive coupling 6, in such a way that the end of the carrier arm 11 also lies above the drive coupling 6. The agricultural device 1 has an end of the drive coupling shaft 8 at the site of the fastening of the coupling frame 5 to the carrier frame 2 that is lower than the coupling point 7 on the coupling frame 5.

At the other end of the carrier frame 2 at the level of the agricultural implement, the drive coupling shaft 8 is operatively connected to a telescopic drive shaft. The telescopic drive shaft is connected to the further drive of the agricultural implement. Eight tedder rotors are fastened to the carrier frame 2 so as to be hingeable via a coupling device 13 with hinges 20 (one of which is shown).

As shown in FIG. 2, an agricultural implement is tiltable between a working position WS, a headland position KS and a transport position TS. In FIG. 2, the angle between the working position and headland position is denoted by 'a' and the angle between the headland position and transport position is denoted by 'b'. The tedder is depicted in the working position WS. In this position, the tedder rotors 21 rest, each with their own supporting wheel 24, on the ground. In the working position WS, the tillage member 21 of the agricultural implement is nearby, on or in the ground. In the transport position TS, the agricultural implement is hinged upwards so that the tillage members 21 are relatively far away from the ground.

For placing the tillage members 21 in and out of the working position, the agricultural device 1 comprises a coupling device 13 with a fold-up device 16 which is activatable by a fold-up cylinder 17. The tillage members 21 are fastened to a central tillage frame 19 which is fastened to the carrier frame 2 so as to be hingeable via hinges 20 and wherein the fold-up cylinder 17 is connected to the central tillage frame 19.

Within certain limits, the tedder rotors 21 are freely vertically movable in the working position WS. As a result of the fact that the central tillage frame 19 is connected to the fold-up cylinder 17 via a slotted hole, it can tilt freely so as to be able to follow the ground. In the working position, the weight of the carrier frame 2 will usually exert sufficient pressure on the coupling points 7.

Furthermore, the agricultural device 1 is often embodied in such a way that, in the transport position TS, the agricultural implements take up relatively little space in the width and height. This is advantageous because the agricultural device 1 then takes up less space. Moreover, this is sometimes required in order to enable the vehicle to join (public) traffic.

The agricultural device 1 as shown in FIG. 1 comprises at both sides of the carrier frame 2 elongate wings 18A, 18B with tillage members, which wings 18A, 18B extend, in the working position WS, laterally of the carrier frame 2 and, in the transport position TS, parallel to the direction of travel R. In the transport position, each wing 18A, 18B is folded up in 2 parts wherein the three outermost rotors of each wing 18A, 18B are rotated over 180 degrees. The wings 18A, 18B then rest on supporting arms of the carrier frame 2. In the transport position, the combined centre of gravity of the tillage members 21 lies in front of the set of wheels 4.

In order to place the agricultural implements in the transport position TS, it is often necessary to shut down the drive of the tillage members 21. However, it is often desirable during the tilling of a crop or soil to raise the tillage members 21 from the ground without the drive having to be shut down, for example when turning round at the end of a field or piece of land. For this purpose, the agricultural implements of an agricultural device 1 can often be set in what is known as a headland position wherein the drive does not have to be shut down and the tillage members 21 are free of the crops and/or ground. The angle between the working position WS and headland position KS, for example 10-30 degrees, is usually less than the angle between the headland position and the transport position, for example 40-60 degrees.

In FIG. 2, the agricultural implement is in the working position WS. As a result of the energizing of the fold-up cylinder 17, the agricultural implement will be drawn from the ground.

When the machine is set from the working position WS into the transport position TS, the headland position KS will first be assumed. During the raising of the tillage members 21 from the ground, the combined centre of gravity of the tillage members 21 will have a leverage effect with respect to the set of wheels 4 and it will exert an upwardly directed force on the coupling frame 5. As a result of the high position of the coupling points 7 of the coupling frame 5, it is possible to prevent the carrier arms 11 from moving upwards as a consequence of the force which is produced.

During a partial stroke of the fold-up cylinder 17, the agricultural implements will be tilted over the angle a and be in the headland position KS. During the complete stroke of the fold-up cylinder 17, the agricultural implements can be moved over the angle b from the headland position KS to the transport position TS.

For tilting from the headland position to the transport position, the agricultural implement can be folded-in by means of hydraulic cylinders so that they as a whole take up relatively little space in the transport position. The fold-up device 16 further comprises cylinders which cause the outermost three rotors of each wing 18A, 18B to fold inwards over 180 degrees. Subsequently, the central tillage frame 19 with the rotors 3 tilts further forwards to an angle of approximately 80 degrees. The last step is the folding-forward of the two wings 18A, 18B above the carrier frame 2. When the fold-up cylinder 17 is fully retracted, the two wings 18A, 18B rest on the carrier arms 11 of the carrier frame 2.

In addition to the embodiments shown, various variants are possible without thereby departing from the scope of protection, such as is defined in the enclosed claims. The invention is not limited to the described embodiment in the form of a tedder. The invention can also be applied to an agricultural device wherein the tillage members 21 are embodied as soil tillage members. In an agricultural device 1 of this type, it is advantageous if the tillage members 21 are attached behind the set of wheels 4 so that the wheels 4 can no longer disturb the tilled soil. The towed agricultural device 1 can also form part of a self-propelled agricultural device wherein the tractor and the agricultural device are integrated.

The invention therefore provides an agricultural device 1 wherein at least one of the coupling points 7 is positioned sufficiently high as to greatly reduce the risk of an upwardly-folding carrier arm 11. This increases operational safety and can prevent damage.

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An agricultural device for coupling an agricultural implement to a tractor vehicle, wherein the tractor vehicle has carrier arms, wherein the only tensile force transmitting coupling between the tractor and the agricultural device is at the carrier arms, the agricultural device comprising:
    a carrier frame extending in the longitudinal direction over a centre line, the carrier frame having at a first end a set of wheels and a coupling device for coupling the agricultural implement, wherein the agricultural implement can be held by the coupling device in a working position and in a raised position; and
    a coupling frame connected to a second end of the carrier frame and hingeable about an upward axis of rotation, the coupling frame having at least one coupling point for coupling of the coupling frame to both carrier arms of the tractor vehicle; and wherein
    the coupling frame is connected to the carrier frame so as to be rigid in rotation in a vertical plane, wherein at least one coupling point of the coupling frame is positioned above a centre line of the carrier frame; and wherein the coupling point is vertically positioned in such a way that, after coupling of the agricultural device to the tractor vehicle, the carrier arms extend upwardly front the tractor vehicle.

2. The agricultural device according to claim 1, wherein the agricultural device further comprises a drive coupling shaft at the second end of the carrier frame with a centre line for coupling the agricultural implement to the drive shaft of the tractor vehicle to drive the agricultural implement.

3. The agricultural device according to claim 1, wherein at least one coupling point on the coupling frame is height-adjustable.

4. The agricultural device according to claim 1, wherein the coupling frame is V-shaped.

5. The agricultural device according to claim 1, wherein the coupling frame comprises a safety member for counteracting an excessively high position of the carrier arms.

6. The agricultural device according to claim 5, wherein the safety member is a chain.

7. The agricultural device according to claim 1, wherein the coupling device comprises a fold-up device for placing the agricultural implement in and out of a working position.

8. The agricultural device according to claim 1, wherein the agricultural implement is attached to the carrier frame, in the working position and viewed in the direction of travel, behind the set of wheels.

9. The agricultural device according to claim 1, wherein the agricultural implement comprises at both longitudinal sides of the carrier frame elongate wings with tillage members, wherein the wings extend in the working position laterally of the carrier frame.

10. The agricultural device according to claim 9, wherein the tillage members are fastened to a central tillage frame.

11. The agricultural device according to claim 9, wherein the tillage members are tedder rotors for picking up and throwing up crops lying on the ground.

12. The agricultural device according to claim 1, wherein the device is implemented in a tedder.

13. The agricultural device according to claim 1, wherein the device is implemented in a mower.

14. The agricultural device according to claim 2, wherein at least one coupling point of the coupling frame is positioned on the centre line of the drive coupling shaft.

15. The agricultural device according to claim 2, wherein the coupling point is positioned above the centre line of the drive coupling shaft.

16. An assembly made up of a tractor vehicle, wherein the tractor vehicle has carrier arms, and an agricultural device for coupling an agricultural implement to the tractor vehicle, wherein the only tensile force transmitting coupling between the tractor and the agricultural device is at the carrier arms, the agricultural device comprising:
    a carrier frame extending in the longitudinal direction over a centre line, the carrier frame having at a first end a set of wheels and a coupling device for coupling the agricultural implement, wherein the agricultural implement can be held by the coupling device in a working position and in a raised position; and
    a coupling frame connected to a second end of the carrier frame and hingeable about an upward axis of rotation, the coupling frame having at least one coupling point for coupling of the coupling frame to both carrier arms of the tractor vehicle; and wherein
    the coupling frame is connected to the carrier frame so as to be rigid in rotation in a vertical plane, wherein at least one coupling point of the coupling frame is positioned above a centre line of the carrier frame, and wherein the coupling point is vertically positioned in such a way that, after coupling of the agricultural device to the tractor vehicle, the carrier arms extend upwardly from the tractor vehicle.

17. The assembly according to claim 16, wherein the agricultural device further comprises a drive coupling shaft at the second end of the carrier frame with a centre line for coupling the agricultural implement to the drive shaft of the tractor vehicle to drive the agricultural implement.

18. The assembly of according to claim 17, wherein at least one coupling point of the coupling frame is positioned on the centre line of the drive coupling shaft.

19. The assembly according to claim 17, wherein the coupling point is positioned above the centre line of the drive coupling shaft.

* * * * *